United States Patent

Shepherd, Jr.

[15] 3,670,038

[45] June 13, 1972

[54] CHEMICAL PROCESS

[72] Inventor: Lawrence H. Shepherd, Jr., Baton Rouge, La.

[73] Assignee: Ethyl Corporation, New York, N.Y.

[22] Filed: Nov. 9, 1970

[21] Appl. No.: 88,170

Related U.S. Application Data

[63] Continuation-in-part of Ser. No. 802,267, Feb. 25, 1969, Pat. No. 3,597,487.

[52] U.S. Cl. ................260/665 R, 252/431 R, 260/413, 260/632 C, 260/665 G, 260/677 R
[51] Int. Cl. ................................................C07j 3/02
[58] Field of Search ..................260/665 R, 665 G

[56] References Cited

UNITED STATES PATENTS 2,959,625  11/1960  Blitzer et al........................260/665 G
3,247,268  4/1966  O'Alelio..............................260/665 G

OTHER PUBLICATIONS

Podall et al., J. Org. Chem. 23 (1958) pp. 1848– 1852.

*Primary Examiner*—Tobias E. Levow
*Assistant Examiner*—A. P. Demers
*Attorney*—Donald L. Johnson, John F. Sieberth and Arthur G. Connolly

[57] ABSTRACT

Dialkylmagnesium compounds undergo a smooth, uncatalyzed chain growth reaction with ethylene or other normally gaseous monoolefins provided the reaction is conducted in a single phase liquid reaction system. Aromatic hydrocarbons or weakly basic ethers are employed as the solvents. The dialkylmagnesium reactants used are those which are completely dissolved in the solvent under the chain growth conditions being used. The process often involves less undesirable side reactions than a comparable chain growth reaction involving an organoaluminum compound.

10 Claims, No Drawings

CHEMICAL PROCESS

CROSS-REFERENCE TO RELATED APPLICATION

This application is a continuation-in-part of prior application, Ser. No. 802,267, filed Feb. 25, 1969 now U.S. Pat. No. 3,597,487 issued Aug. 8, 1971.

This invention relates to the preparation of organomagnesium compounds. More particularly, this invention is concerned with the chain growth of organomagnesium compounds.

BACKGROUND

As is well known, Ziegler and his colleagues have discovered that certain organometallic compounds will undergo a progressive intermolecular addition reaction with ethylene and like low molecular weight olefinic compounds, a process which is often referred to as "chain growth." For example, Ziegler and Gellert in U.S. Pat. No. 2,826,598 describe the chain growth reaction as applied to aluminum alkyls and beryllium alkyls. In U.S. Pat. No. 2,975,215 Ziegler, Köster and Kroll describe the chain growth of boron alkyls with ethylene using aluminum trialkyls as catalysts.

U.S. Pat. No. 3,404,194 to Crain and Reusser discloses that organomagnesium halide compounds obtained by heating an ether solution of an organomagnesium halide to drive off the ether can be mixed with an organolithium compound to form a catalyst which may be used for converting ethylene to higher hydrocarbons, principally 1-olefins.

An advantage of the aluminum alkyl chain growth reaction is that it enables the production of higher molecular weight aluminum alkyls from the lower molecular weight members at relatively low cost. For example, ethylene addition to triethylaluminum produces long chain aluminum alkyls which, on oxidation and hydrolysis, yield alcohols. Commercial processes for the production of detergent range alcohols ($C_{12}$–$C_{6}$) are based in part on this technology.

Ziegler, Köster and Grimme point out in U.S. Pat. No. 3,217,020 that a chain growth reaction analogous to the aluminum trialkyl chain growth reaction is unknown for magnesium alkyls and that although magnesium alkyls react with ethylene, a product composed predominantly of polyethylene is formed, there being no formation of reaction products comparable to the synthesis products of limited carbon number which are formed when chain growing aluminum trialkyls. On the other hand, Podall et al. J. Org. Chem. 23, 1848–52 (1958) states (page 1850) that in n-hexane or n-heptane it was found that diethylmagnesium reacts quantitatively with ethylene at 100° C., 600–900 psig to produce (after hydrolysis) liquid hydrocarbons ranging from $C_{10}$ up, and a small quantity of solid polymer.

U.S. Pat. No. 2,959,625 indicates in Example VI that in a reaction between ethylene and magnesium hydride in anisole using lithium aluminum hydride as a catalyst, dialkylmagnesium compounds are produced and significant chain growth occurs.

THE INVENTION

This invention involves, inter alia, the discovery that dialkylmagnesium compounds will readily undergo a smooth, uncatalyzed chain growth reaction to form higher molecular dialkylmagnesium compounds provided the reaction is conducted in a single phase or homogeneous liquid reaction system. To achieve this new and improved result the reaction is performed in an essentially non-complexing solvent—i.e., a solvent which is weakly basic relative to the dialkylmagnesium reactant. Although the matter of chemical basicity is for all practical purposes a continuum, solvents which dissolve the dialkylmagnesium reactant and have a basicity less than that of diethyl ether will be found appropriate for use in this invention. Solvents of this character include aromatic hydrocarbons and such ethers as anisole, phenetole, diisopropyl ether, and the like. As is well known, such ethers have a lower basicity than diethyl ether. See for example Hamelin, Bull. soc. chim. France, 1961, 684–92 and Hamelin and Hayes, Ibid. 692–7.

The dialkylmagnesium reactant must be soluble in the liquid reaction medium under the chain growth conditions being employed. This in turn is dependent upon the configuration of the alkyl groups present in the dialkylmagnesium molecule. In aromatic hydrocarbons such as benzene and the like, di-sec-butyl magnesium, di-tert-butyl magnesium and suitable mixtures of normal and secondary butyl magnesiums (e.g., n-butyl-sec-butyl magnesium) are the lowest molecular weight dialkylmagnesium compounds which fulfill this solubility requirement. The lower molecular weight members of the series such as diethylmagnesium and dipropylmagnesium are thus unsuitable for the practice of this invention.

This invention involves, inter alia, the further discovery that the chain growth reaction as applied to such dialkylmagnesium compounds will often involve a lesser amount of undesired side reactions than a comparable chain growth reaction involving an organoaluminum compound. In comparative experiments conducted under the same conditions the amount of decomposition occurring in an aluminum alkyl chain growth reaction was found to be about twice that in the organomagnesium chain growth reaction.

The practice and advantages of this invention will become still further apparent from the following illustrative examples.

EXAMPLE I

Chain Growth of Diamyl Magnesium

A benzene solution of diamyl magnesium was prepared by the method of Glaze and Selman, J. Organometallic Chem. 5, 447–480 (1966). The presence and concentration of diamyl magnesium in the solution were verified by chemical analyses.

Fifty ml of the diamyl magnesium/benzene solution was placed in an autoclave, pressured to 400 psi with ethylene and heated to 150° C. The ethylene pressure was then raised to 800 psi and the solution was stirred and kept at about 150° C. for 4 hours. After the reaction was completed, the autoclave was cooled and vented, and the liquid reaction product was recovered. The composition of the organomagnesium product was ascertained by subjecting a known aliquot of the product solution to hydrolysis and determining the identities and amounts of the liberated alkanes by vapor phase chromatography. It was found that the product contained a mixture of alkyl magnesium compounds containing $C_5$, $C_7$, $C_9$, $C_{11}$, $C_{13}$, $C_{15}$, $C_{17}$ and $C_{19}$ alkyl groups. The distribution was as follows:

| Alkyl Group | Mole Percent |
| --- | --- |
| $C_5$ | 25.4 |
| $C_7$ | 26.0 |
| $C_9$ | 23.8 |
| $C_{11}$ | 14.3 |
| $C_{13}$ | 6.6 |
| $C_{15}$ | 2.9 |
| $C_{17}$ | 0.9 |
| $C_{19}$ | 0.2 |

The analysis showed that the alkanes liberated on hydrolysis contained only a slight amount of olefins, indicating that the chain growth reaction proceeded quite cleanly and that little if any thermal elimination or displacement by ethylene had occurred.

In order to compare the extents to which a dialkylmagnesium chain growth reaction and a trialkylaluminum chain growth reaction undergo undesired competing reactions (i.e., thermal elimination and/or displacement of alkyl groups) two experiments were carried out under the same reaction conditions using similar organometallic reactants. In both cases the reactions were performed in a single phase liquid reaction system. These experiments are described in Example II.

EXAMPLE II

Chain Growth of Amyl Magnesium

Compared with Chain Growth of Hexyl Aluminum

A benzene solution of diamyl magnesium was placed in an autoclave and reacted with ethylene under 2,500 psi for 1 hour at 150° C. A known portion of the liquid reaction product was hydrolyzed and subjected to analysis using vpc.

In a parallel experiment a benzene solution of trihexyl aluminum was treated with ethylene at 2,500 psi at 150° C. for 1 hour. The same analytical procedure was used—known portion of the reaction product was hydrolyzed and subjected to analysis using the same vpc technique.

The results of these experiments are set forth in the following table:

Distribution of Products in Comparable

Chain Growth Reactions

| Chain Growth of Amyl Magnesium | | | Chain Growth of Hexyl Aluminum | | |
|---|---|---|---|---|---|
| | Mole Percentage of Liberated Hydrocarbons | | | Mole Percentage of Liberated Hydrocarbons | |
| Carbon No. | n-alkanes | n-alkenes | Carbon No. | n-alkanes | n-alkenes |
| $C_7$ | 8.1 | 5.8 | $C_2$ | 2.6 | — |
| $C_9$ | 11.7 | 4.8 | $C_4$ | 4.3 | — |
| $C_{11}$ | 14.4 | 3.2 | $C_6$ | 9.5 | 6.4 |
| $C_{13}$ | 15.2 | 3.0 | $C_8$ | 10.0 | 6.9 |
| $C_{15}$ | 12.5 | 1.2 | $C_{10}$ | 7.6 | 8.1 |
| $C_{17}$ | 9.1 | 0.7 | $C_{12}$ | 7.4 | 4.5 |
| $C_{19}$ | 5.6 | 0.4 | $C_{14}$ | 6.0 | 3.2 |
| $C_{21}$ | 3.1 | — | $C_{16}$ | 4.8 | 2.7 |
| $C_{23}$ | 1.3 | — | $C_{18}$ | 3.9 | 2.0 |
| Total: | 81.0 | 19.1 | $C_{20}$ | 2.9 | 1.4 |
| | | | $C_{22}$ | 2.4 | 0.7 |
| | | | $C_{24}$ | 1.7 | — |
| | | | $C_{26}$ | 1.0 | — |
| | | | Total: | 64.1 | 35.9 |

Thus in the case of the alkyl magnesium chain growth reaction the hydrolysis gases contained about 19 mole percent of olefin whereas the alkyl aluminum chain growth reaction product contained about 36 mole percent olefin. In other words the ratio of alkyl groups to olefin in the magnesium reaction was about 4.3 whereas the same ratio in the case of the aluminum reaction was about 1.8.

As noted above, aromatic hydrocarbons which are liquid under the reaction conditions are useful solvents in the present process. These may be used singly or in various combinations. Mononuclear aromatic hydrocarbons are preferred for use when chain growing with ethylene, a reaction which is normally conducted at superatmospheric pressure. Exemplary aromatic hydrocarbon solvents include benzene, toluene, xylenes, mesitylenes, durene, ethyl benzene, isopropyl benzene, cymene, naphthalene, 1-methyl naphthalene, 2-methyl naphthalene, biphenyl, tetrahydronaphthalene, and the like. The presence of substituents in the aromatic hydrocarbons is not prejudicial provided the substituents are sufficiently inert chemically as not to interefere with the desired reaction. Thus the presence in the hydrocarbon of innocous substituents such as trimethylsilyl, triphenysilyl, etc., may be found acceptable.

Ethers having a chemical basicity (vis-a-vis dialkyl magnesium compounds) less than that of diethyl ether are likewise suitable for use in the present process. Thus recourse may be had to such reaction solvents as diisopropyl ether, anisole, phenetole, diphenyl ether, phenyl isopropyl ether, and the like.

The dialkyl magnesium reactants are usually chain grown in accordance with the invention in a reaction medium composed at least predominantly of a suitable aromatic hydrocarbon, although the use of a weakly basic ether is feasible. It will of course be appreciated that the reaction medium in which the process is conducted can be composed of mixtures of aromatic hydrocarbons and ethers of this character. Similarly, it is possible to use aromatic hydrocarbons in admixture with minor amounts of paraffins or cycloparaffins or both so long as the resultant liquid blend contains a sufficiently large proportion of aromatics to keep the dialkyl magnesium reactant in solution under the chain growth reaction conditions being used. Moreover, small quantities of more basic substances such as diethyl ether, triethyl amine, pyridine, tetrahydrofuran, and the like may be present within the reaction medium provided, however, that they are present in sufficiently small amount as not to prevent or markedly inhibit the desired chain growth reaction. As a general proposition, the lower the amount of such strongly basic substance the better.

The suitability of any given solvent for use in the present process can readily be ascertained by means of a simple pilot experiment utilizing, for instance, the procedure of Example I.

Aromatic hydrocarbons, especially those of the benzene series, which are liquid under the reaction conditions employed are the preferred solvents for use in this invention.

Exemplary dialkyl magnesium reactants for use in this process include di-sec-butyl magnesium, di-tert-butyl magnesium, n-butyl-sec-butyl magnesium, diamyl magnesium, di-neopentyl magnesium, bis-3-methylbutyl magnesium, di-sec-amyl magnesium, dihexyl magnesium and similar higher homologous dialkyl magnesium compounds in which each alkyl group contains up to about 18, and preferably up to about 10, carbon atoms. If desired, mixtures of such compounds may be used.

The other reactant employed in the present process is preferably ethylene although use may be made of other normally gaseous monoolefins such as propylene and butene-1. These olefins may be substantially pure or they may be associated with inerts such as normally gaseous paraffins.

The chain growth reaction of the present invention should be conducted at suitably elevated temperatures and pressures, that is temperatures and pressures which are sufficient to effect the desired reaction at an appropriate reaction rate without incurring excessive decomposition of the desired dialkyl magnesium product. Although the temperatures and pressures will vary to some extent depending upon the nature of the reactants and reaction medium being employed, temperatures within the range of from about 50° C. to about 250° C. will generally be found suitable. Temperatures in the range of from about 125° C. to about 175° C. are preferred. The reaction will usually be run under superatmospheric pressures ranging from about 200 psig up to about 5,000 psig or more. When using an ethylene as the olefin reactant, pressures in the range of from about 2,000 psig to about 3,000 psig are particularly suitable. In the case of ethylene chain growth, at least a portion of the initial alkyl groups will be grown by at least six carbon atoms. The extent to which this growth proceeds will be determined to a degree by the reactivity of the dialkyl magnesium reactant employed, the makeup of the reaction medium used, the severity of the reaction conditions employed and the proportion of the olefinic reactant relative to the dialkyl magnesium reactant.

The chain grown alkyl magnesium compounds producible by this invention are of particular use as intermediates to desirable products of commerce. For example, the chain grown compounds may be readily oxidized with oxygen or air and thereupon hydrolyzed so as to produce the corresponding alcohols. Thus plasticizer and detergent range alcohols may be synthesized by means of the present process. Alternatively the chain grown magnesium products may be treated with carbon dioxide and then readily converted by hydrolysis into fatty acids. Also, olefins may be produced on the basis of the present process, in particular by treating the chain grown alkyl magnesium compounds with an olefin (usually of lower molecular weight than the desired product) under elevated temperature conditions to effect displacement of the alkyl groups (as olefins) by the displacing olefin. In general, the products producible by the methods of this invention can be utilized in the same type of chemical reactions as conventional Grignard reagents prepared by other means.

If desired, some of the organomagnesium products producible by the process of this invention may be recovered and used as such as components of catalyst systems, e.g., for the production of polyethylene or polypropylene by techniques discovered by Ziegler, Natta and their colleagues. In most cases, however, the organomagnesium products prepared in accordance with this invention will not be recovered and isolated as such. Rather, they will be utilized primarily as intermediates for further chemical reaction.

When conducting the process of this invention the usual precautions used in conventional Grignard syntheses will of course be observed. For example, the reaction system will be kept as anhydrous as practicable. In addition, the hydrocarbyl magnesium reactants will not be exposed excessively to the atmosphere.

I claim:

1. A process for the production of higher alkylmagnesium compounds from alkylmagnesium compounds of lower molecular weight which comprises reacting ethylene, propylene or butene-1 and a dialkylmagnesium compound dissolved in an essentially non-complexing reaction solvent consisting essentially of aromatic hydrocarbon, ether having a basicity less than that of diethyl ether, or any mixture of two or more of the foregoing, said reaction being conducted in the absence of a catalyst and in a single phase liquid reaction system at a superatmospheric pressure of at least about 200 psig and reaction temperature within the range of about 50° C. to about 250° C. sufficient to effect the reaction without incurring excessive decomposition of the desired product.

2. The process of claim 1 wherein ethylene is employed as the reactant.

3. The process of claim 1 wherein ethylene is employed as the reactant and the reaction solvent consists essentially of a liquid aromatic hydrocarbon of the benzene series.

4. The process of claim 1 wherein said reaction temperature is in the range of from about 125° C. to about 175° C.

5. The process of claim 1 wherein ethylene is employed as the reactant, the reaction solvent consists essentially of a liquid hydrocarbon of the benzene series, said pressure is in the range of from about 2,000 psig to about 3,000 psig and said reaction temperature is in the range of from about 125° C. to about 175° C.

6. The process of claim 1 wherein ethylene is employed as the reactant and the dialkylmagnesium reactant is diamylmagnesium.

7. The process of claim 1 wherein ethylene is employed as the reactant, the reaction solvent consists essentially of a liquid hydrocarbon of the benzene series, said pressure is in the range of from about 2,000 psig to about 3,000 psig, said reaction temperature is in the range of from about 125° C. to about 175° C. and the dialkylmagnesium reactant is diamylmagnesium.

8. The process of claim 1 wherein said reaction solvent is predominately benzene.

9. The process of claim 1 wherein the reactants are ethylene and diamylmagnesium, the reaction solvent is predominantly benzene, said pressure is in the range of from about 2,000 psig to about 3,000 psig and said reaction temperature is in the range of from about 125° C. to about 175° C.

10. The process of claim 1 wherein the reactants are ethylene and diamylmagnesium, the reaction solvent is predominantly benzene, said pressure is about 2,500 psig and said temperature is about 150° C.

* * * * *